Aug. 26, 1958  F. T. HARRIGAN  2,848,862
GRASS CONVEYOR FOR MOWERS
Filed March 7, 1957  2 Sheets-Sheet 1

Floyd T. Harrigan
INVENTOR.

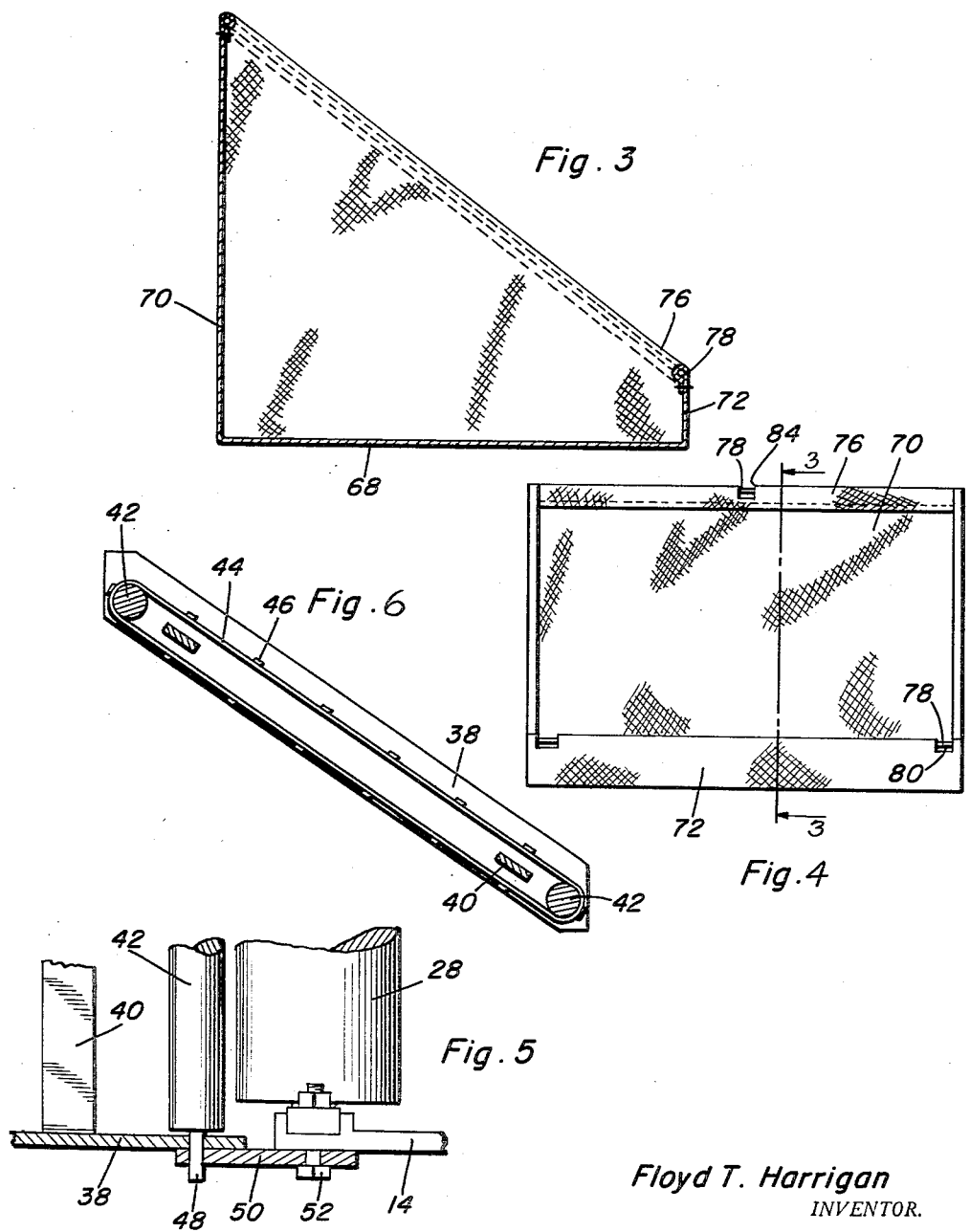

2,848,862

GRASS CONVEYOR FOR MOWERS

Floyd T. Harrigan, Hobart, Ind.

Application March 7, 1957, Serial No. 644,588

3 Claims. (Cl. 56—199)

The present invention generally relates to an attachment for lawn mowers and more particularly relates to an attachment for catching the grass after it has been cut by the lawn mower and conveying the same rearwardly into a receptacle therefor, so that the cut grass clippings will not block the normal operation of the reel of the mower.

An object of the present invention is to provide an attachment for a reel type mower which is an improvement over my prior Patent No. 2,031,038, issued February 18, 1936.

A further object of the present invention is to provide a grass conveying and carrying attachment for the reel type mower in which the conveyor is of the endless belt type and is supported from the frame and handle of the mower and driven directly from the power means for the reel of the mower.

A further important feature of the present invention is to provide an attachment for reel type lawn mowers in which the grass receiving receptacle is mounted for easy removal and emptying thereof, the drive means for the conveyor is positive and which is simple in construction, easy to attach to existing lawn mowers of the reel type whether they be of the hand operated or power type.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a detailed sectional view taken substantially along section line 3—3 on Figure 4 illustrating the construction of the receptacle for the grass clippings with the receptacle removed from the mower;

Figure 4 is a front view of the grass catching receptacle illustrating the cut out areas for receiving the supporting means therefor;

Figure 1:
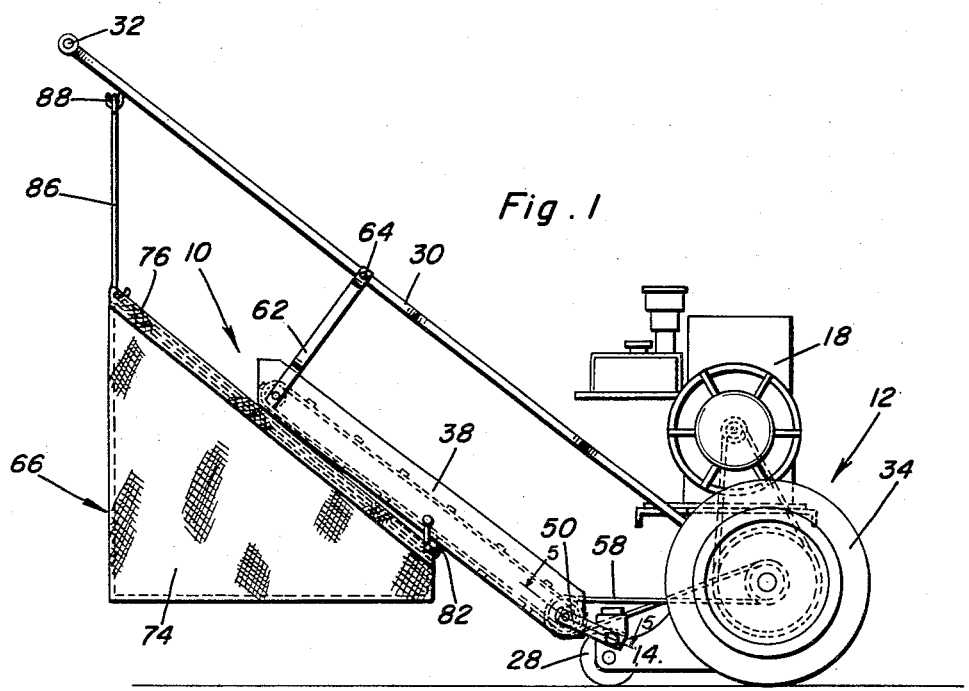
Figure 1 is a side elevational view of the attachment of the present invention installed on a power reel type mower.
Figure 2:
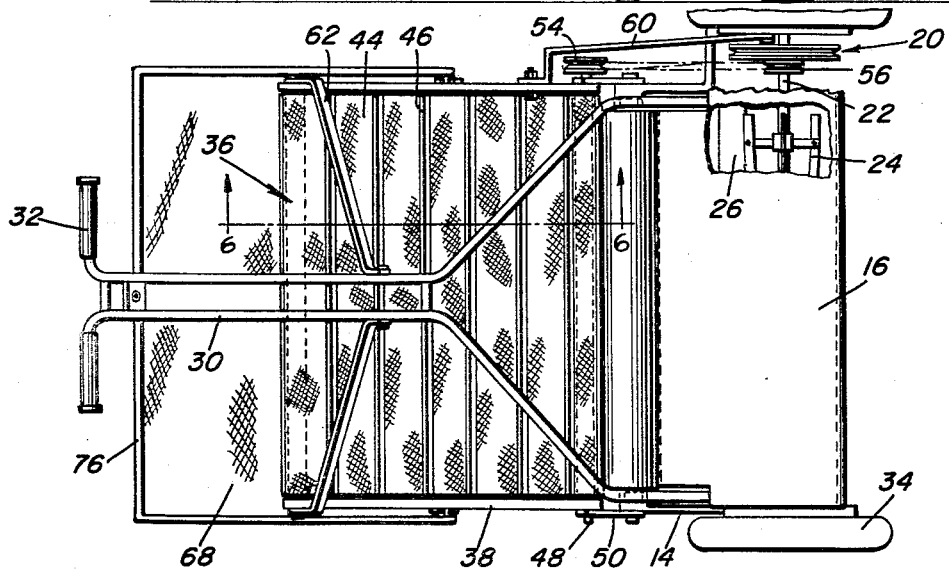
Figure 2 is a plan view of the construction of Figure 1 with the motor removed and parts broken away.

Figure 5 is an enlarged detailed sectional view taken substantially along section line 5—5 on Figure 1 with parts omitted for illustrating the construction for supporting the front end of the conveyor adjacent to the cutter bar and roller of the power mower; and Figure 6 is a detailed sectional view taken substantially along section line 6—6 on Figure 2 illustrating the conveyor with one side wall thereof removed for showing the details of construction with the conveyor being shown by itself.

Referring now specifically to the drawings, the numeral 10 generally designates the attachment of the present invention which is adapted to be attached to a conventional power lawn mower 12 which has the usual frame 14, supporting plate 16 for the motor 18 together with a power pulley 20 mounted on the reel shaft 22 with the conventional spiral type reel 24 being connected to the shaft 22 in the usual manner. A cutter bar 26 is provided in association with the reel 24 so that the grass is cut in the usual manner. Also, a depth roller 28 is adjustably connected to the rearwardly extending portions of the frame 14 for controlling the depth of cut of the mower 12. A rearwardly extending handle 30 is connected to the frame 14 for controlling operation of the mower 12. The handle 30 is provided with hand grips 32 for ease of manipulation of the mower 12. It is pointed out that the attachment may also be connected to a hand operated type of mower in which the same construction is employed except that the power pulley is eliminated and the reel is turned by the traction wheels 34 which also supports the frame 14.

The attachment 10 includes a conveyor generally designated by the numeral 36 which includes a pair of side plates 38 interconnected by a plurality of rigid bars 40 and being provided with a transverse roller 42 interconnecting the ends thereof and rotatably supported thereon. An endless flexible belt 44 encircles the rollers 42 and the belt 44 is provided with a plurality of transverse slats 46 for carrying the material upwardly and rearwardly generally in parallel relation to the handle 30. The forward roller 42 is provided with projecting ends or axial extensions 48 on each end thereof with the ends 48 extending through brackets 50 secured to the rearwardly extending portion of the frame 14 by clamp bolt 52 which permits variation in the position of the front end of the conveyor 36. One end of the roller 42 is provided with a pulley 54 on the extension 48 which is in alignment with a pulley 56 on the main shaft 22 of the reel 24 and a belt 58 encircles the pulleys 54 and 56 for driving the conveyor 36.

A guard or shield 60 is provided in overlying relation to the pulleys 54 and 56 as well as the belt 58 thus protecting the same from becoming entangled with grass and also preventing accidental engagement of the drive mechanism with clothing or the like. The rear end of the conveyor is supported by a pair of upwardly and inwardly extending brackets 62 which are connected to the handle 30 by fastening members 64. Thus, the conveyor 36 will be maintained in generally parallel relation to the handle 30 and is disposed immediately rearwardly of the cutter bar for receiving grass clippings therefrom whereby the rotation of the main shaft 22 will drive the conveyor through the belt 58 in such a manner that the grass clippings will be moved rearwardly on the upper surface thereof.

A grass catching receptacle generally designated by numeral 66 is supported beneath the rear end of the conveyor 36 for receiving grass clippings therefrom. The grass catching receptacle 66 is in the form of an enlarged flexible container preferably of canvas or the like having a bottom 68, rear wall 70, front wall 72 and side walls 74 with the front wall 52 being considerably less in height than the rear wall 70 as illustrated in Figure 3. The upper edges of the front wall 72, rear wall 70 and side walls 74 are provided with a hem 76 receiving a reinforcing wire member 78 therein. The front wall 72 is provided with a pair of slots 80 revealing the reinforcing wire 78 for engagement with a pair of hook members 82 pivotally supported from the side members 38 of the conveyor 36. The rear wall 70 is provided with a slot or notch 84 in the center thereof for revealing the wire rod 78 for receiving an elongated supporting rod 86 having an eye member on the upper end thereof engaging a hook 88 supported from the upper end of the handle 30 thus detachably supporting the receptacle 66 from the handle and conveyor respectively in such a manner that the grass will be deposited into the receptacle from the conveyor 36 thus assuring that the grass clippings will be removed from the area of the reel and assuring that the grass clippings will be disposed in the receptacle rather than on the ground surface.

While a belt drive has been illustrated, it is pointed out that other types of drive mechanisms may be employed which will provide a positive driving connection between the main shaft and the conveyor.

The receptacle may be constructed of canvas or similar material and colored vividly in such a manner that the entire attachment along with the lawn mower will be pleasing in appearance as well as utilitarian.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An attachment for reel type lawn mowers having a rearwardly and upwardly extending handle, a frame, wheels on said frame, a cutter bar on said frame, and a reel rotatably powered and supported on said frame for movement past the cutter bar for cutting grass, said attachment comprising a rearwardly and upwardly inclined conveyor, means connected with the front of the conveyor and pivotally supporting the front end of the conveyor from said frame adjacent to and in trailing relation to the cutter bar for receiving grass clippings therefrom, means connected with the rear of the conveyor and the handle for suspending the rear end of the conveyor from the handle, an enlarged receptacle disposed under the rear end of the conveyor for receiving grass clippings therefrom, means interconnecting the receptacle and conveyor and interconnecting the receptacle and handle for removably supporting said receptacle for permitting emptying thereof, and means drivingly connecting said conveyor with the reel, said means pivotally supporting the front end of the conveyor from said frame including a pair of brackets with the forward ends thereof pivotally secured to the frame and the rear ends thereof being pivotally connected to the conveyor whereby the relation between the cutter bar and receptacle may be varied.

2. The combination of claim 1 wherein said conveyor includes a pair of side plates, transverse bars connected with the plates and spacing the plates in rigid parallel relation, end rollers journaled between the plates, an endless belt encircling the end rollers and upstanding slats on said belt for moving material upwardly on the upper surface of the conveyor, the roller at the front end of said conveyor including an axial extension on each end thereof, said extension having driving means associated therewith with the driving means being operatively connected with the reel for positive operation of the conveyor in response to rotation of the reel, said pair of brackets being pivotally mounted on said extensions.

3. The combination of claim 2 wherein said means for removably supporting said receptacle includes a pair of hook members pivotally attached to the central portion of the side plates of the conveyor and engaged with the front end of the receptacle, and a supporting rod connected to the rear end of the receptacle and being detachably connected at its upper end to the handle of the mower rearwardly of the rear end of the conveyor, said receptacle being constructed of flexible material having a reinforcing wire in the upper end thereof for engagement with the hooks and supporting rod.

References Cited in the file of this patent

UNITED STATES PATENTS

| | | |
|---|---|---|
| 2,031,038 | Harrigan | Feb. 18, 1936 |
| 2,597,819 | Provost | May 20, 1952 |
| 2,632,989 | Ross | Mar. 31, 1953 |